United States Patent [19]

Ehrlich et al.

[11] 4,134,853

[45] Jan. 16, 1979

[54] PHOTOCHROMIC COMPOSITION

[76] Inventors: Robert Ehrlich; Melvin Ehrlich, both of 51 The Intervale, Roslyn Estates, N.Y. 11576

[21] Appl. No.: 755,740

[22] Filed: Dec. 30, 1976

[51] Int. Cl.$^2$ .......................... G03C 1/00; A63H 9/00
[52] U.S. Cl. ...................................... 252/300; 46/156
[58] Field of Search ................... 252/300; 350/160 P; 46/156; 96/88; 260/42.57; 106/297, 308 B

[56] References Cited

U.S. PATENT DOCUMENTS

| | | | |
|---|---|---|---|
| 2,084,826 | 6/1937 | Ryan et al. | 106/297 |
| 2,213,168 | 8/1940 | Monk et al. | 106/297 |
| 2,607,659 | 8/1952 | Rummery | 106/297 |
| 2,921,407 | 1/1960 | Wagner et al. | 46/156 |
| 3,317,321 | 5/1967 | Chopoorian | 350/160 P |
| 3,329,648 | 7/1967 | Chopoorian | 350/1 |
| 3,706,560 | 12/1972 | Grain | 96/88 |

*Primary Examiner*—Benjamin R. Padgett
*Assistant Examiner*—Deborah L. Kyle

[57] ABSTRACT

A photochromic composition consisting essentially of titanium dioxide, ferric oxide and lead nitrate. This photochromic compositon can be combined with moldable materials such as a plastisol and formed into toys, such as dolls.

9 Claims, No Drawings

PHOTOCHROMIC COMPOSITION

The invention relates to photochromic compositions and in particular to photochromic compositions which can be combined with various types of moldable or extrudable plastics and plastisol including, for example polyvinyl chloride, acrylates, methacrylates or polyethylenes.

Inorganic photochromic compositions are known in the art. For example, U.S. Pat. No. 3,329,648 issued July 4, 1967 to Chopoorian and U.S. Pat. No. 3,317,321 issued May 2, 1967 to Chopoorian both disclose an inorganic photochromic composition consisting of titanium dioxide ($TiO_2$) activated by ferric oxide ($Fe_2O_3$). In addition these patents further disclose that this inorganic photochromic composition could be dispersed in a vinyl polymer or a polyester. However, the inorganic mixture of titanium dioxide and ferrous oxide produced has a relatively soft crystalline structure which would not disperse uniformly throughout the plastisol.

Accordingly, it is an object of this invention to provide an inorganic photochromic composition which overcomes the problems of the prior art. In particular, it is an object of the invention to provide an inorganic photochromic composition having a crystalline structure which is harder than the prior art inorganic photochromic compositions. The increased hardness permits the composition to be milled to a finer structure which can be thereafter dispersed more uniformly throughout the plastisol to produce more even photochromic properties.

In accordance with the invention a photochromic composition is formed which consists essentially of titanium dioxide, ferrous oxide and lead nitrate; the ferrous oxide being in the range of about 2% to 10% by weight of the titanium dioxide and the lead nitrate in the range of about 0.1% to 1% by weight of the titanium dioxide. A photochromic plastisol is formed by mixing this photochromic composition with an appropriate plastisol.

These and other objects and features of the invention will become more apparent from the detailed examples provided below.

The basic photochromic material is titanium dioxide powder which is available in its water dispersible anatase crystalline form from many sources including New Jersey Zinc Corporation. Titanium dioxide is also available in a rutile crystalline form however, this form of titanium dioxide will not produce the desired photochromic composition. The powdered titanium dioxide is dispersed into distilled water to create a slurry. The amount of water is not critical, however, too much water will increase the time required for the subsequent evaporation step described below. Up to 10% by weight of ferric oxide is then added to the slurry; the amount of ferric oxide depending upon the degree of photochromic activity desired. Finally up to 1% by weight of lead nitrate is added to the slurry.

The slurry is throughly mixed and rapidly dried, for example in a flash drier, to drive off the excess water. Thereafter, the dried mixture is placed in a furnace typically at 1000° C. for approximately fifteen minutes. This high temperature firing insures that the ferric oxide is reduced to ferrous oxide (FeO) and that the lead nitrate is reduced to lead oxide and becomes integral with the crystal structure. Firing temperature is important to proper formation of the photochromic material since too high a temperature can alter the crystalline structure of the titanium dioxide while at too low a temperature the ferric oxide or lead nitrate might not enter the crystal lattice The presence of lead oxide insures a more homogeneous photochromic composition with a harder crystalline structure which can be reduced to sub-micron particles by conventional milling procedures such as micropulverization or jet milling.

The foregoing composition is photochromic and will darken to a deep tan when exposed to sufficient light. Typically, the composition will darken after exposure to sunlight for approximately fifteen to thirty seconds and will return to its normal color within about fifteen minutes after removal from sunlight. It has also been found that the composition will darken when exposed to other light sources, such as an incandescent lamp.

In one specific example, 1000 grams of titanium dioxide was added to distilled water to make a slurry. To the slurry was added 100 grams of ferric oxide and 10 grams of lead nitrate. The excess water was evaporated in a flash dryer and the resulting mixture calcined for fifteen minutes at 1000° C.

If has been found that the photochromic composition is particularly useful when incorporated into a plastic material which is then used to form dolls which will appear to tan when exposed to sunlight. For example, mixing of up to fifty (50%) by weight of the photochromic composition into the plastic material can be advantageously accomplished using conventionally techniques. Flesh tones can be provided by the use of suitable commercially available dies and/or other pigments. Other substances such as viscosity depressants, antioxidants, fillers, inert diluents and the like may also be used.

For example, to form a doll, a slurry of plastisol or other plastic material and photochromic material is injected into a mold which is rotated in a multiplicity of planes thereby causing the slurry to adhere to the walls of the mold. The mold temperature is elevated to cure the slurry. Upon separating the mold, a soft flexible doll which conforms to the interior of the mold can be removed.

What I claim to:
1. A photochromic composition consisting essentially of the calcined mixture of the anatase form of titanium dioxide, ferrous oxide in the range of about 2% to 10% of the weight of the anatase form of titanium dioxide and lead oxide in the range of about 0.1% to 1% of the weight of titanium dioxide.

2. The composition of claim 1 wherein said composition includes 0.2% by weight of lead oxide to the weight of the anatase form of titanium dioxide.

3. A photochromic plastic composition consisting essentially of: a plastic material and a photochromic composition in the plastic material in the range of about 1% to 50% by weight of the plastic material said photochromic composition consisting essentially of the calcined mixture of the anatase form of titanium dioxide, ferrous oxide in the range of about 2% to 10% of the weight of the anatase form of titanium dioxide and lead oxide in the range of about 0.1% to 1% of the weight of the anatase form of titanium dioxide.

4. A doll formed of a photochromic plastic composition consisting essentially of: a plastic material and a photochromic composition in the plastic material in the range of about 1% to 50% by weight of the plastic material, said photochromic composition consisting essentially of the calcined mixture of the anatase form of titanium dioxide, ferrous oxide in the range of about 2% to 10% of the weight of the anatase form of titanium dioxide and lead oxide in the range of about 0.1% to 1% of the weight of the anatase form of titanium dioxide.

5. The method of forming a photochromic composition by calcining a mixture of the anatase form of titanium dioxide, ferric oxide and lead nitrate.

6. The method of forming a photochromic composition comprising the steps of forming a slurry of the anatase form of titanium dioxide, adding ferric oxide and lead nitrate to said slurry, evaporating the excess water from said slurry, calcining the resulting mixture for a time and at a temperature sufficient to form a photochromic composition.

7. The method of forming a photochromic composition as set forth in claim 6 wherein the ferric oxide is up to 10% by weight of the titanium dioxide.

8. The method of forming a photochromic composition in accordance with claim 7, wherein the weight of lead nitrate is up to 1% of the weight of the titanium dioxide.

9. The method of forming a photochromic composition including the steps of forming a slurry of the anatase form of titanium dioxide, adding to said slurry up to 10% by weight of ferric oxide and up to 1% by weight of lead nitrate, drying said slurry to drive off excess water, calcining said dried slurry at temperature of at least 1000° for a time sufficient to form a photochromic composition consisting essentially of the anatase form of titanium dioxide, ferrous oxide and lead oxide.

* * * * *